March 29, 1927.

F. E. RUSH 1,622,848

VEHICLE TIRE

Filed Feb. 27, 1926

INVENTOR.
Frank E. Rush
BY
Thos. Donnelly
ATTORNEY.

Patented Mar. 29, 1927.

1,622,848

UNITED STATES PATENT OFFICE.

FRANK E. RUSH, OF DETROIT, MICHIGAN.

VEHICLE TIRE.

Application filed February 27, 1926. Serial No. 91,082.

My invention relates to a new and useful improvement in a vehicle tire adapted for use on vehicles such as automobiles and the like and has for its object the provision of a tire which is puncture proof and so constructed and arranged as to be possessed of all of the resiliency and cushion effect of the pneumatic tire.

Another object of the invention is the provision of a plurality of co-operating metallic parts for binding a yieldable tread over the periphery of the tire so as to produce a noiseless and yieldable tire.

Another object of the invention is the provision of novel means for binding a rubber tread in position.

Other objects will appear hereinafter.

The invention consists in the combination and arrangement of parts hereinafter described and claimed.

Figure 1:
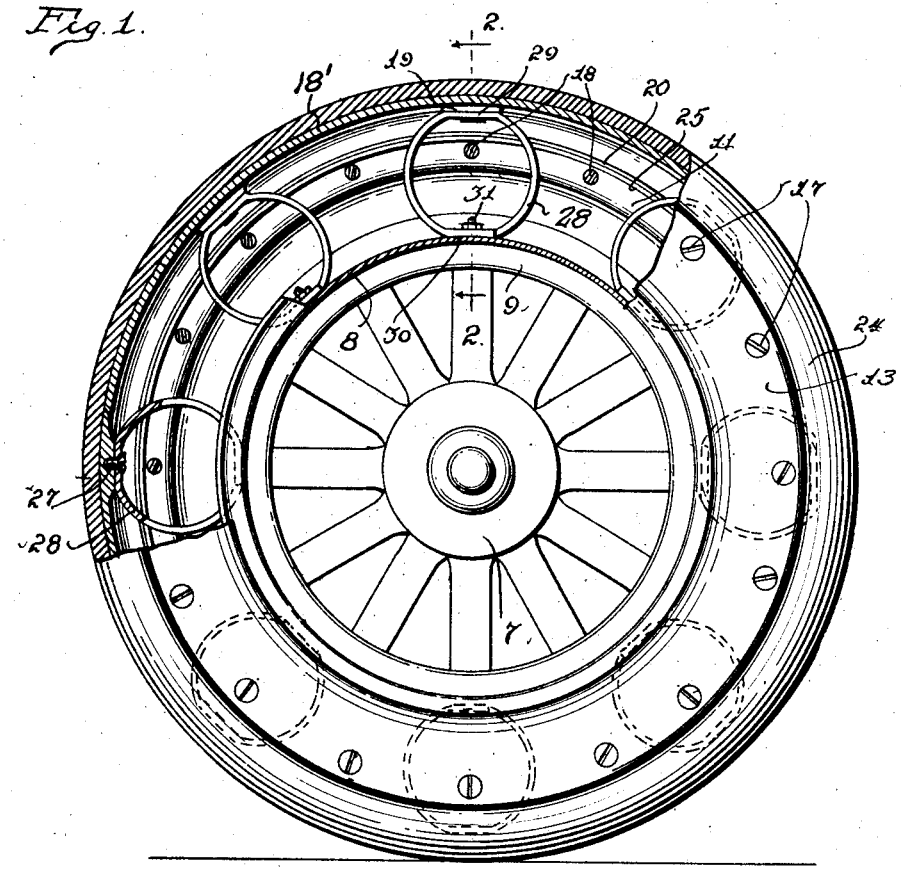

The invention will be best understood from a reference to the accompanying drawings which form a part of this specification in which, Fig. 1 is a side elevational view of the invention applied to a vehicle wheel showing parts broken away and parts in section.

Figure 2:
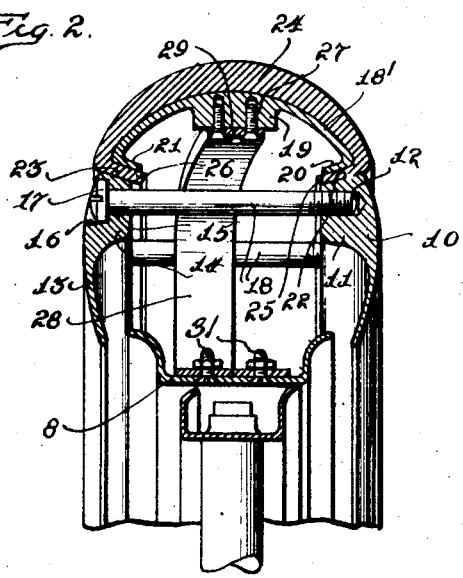

Fig. 2 is a fragmentary transverse sectional view taken on substantially line 2—2 of Fig. 1.

In the drawings I have shown the wheel 7 provided with a flanged rim 8, the particular shape and style of the rim may, of course, be varied to suit the wishes of the manufacturer or to meet special requirements.

The rim is secured in any desirable well known manner to the felly 9. The invention comprises a metallic annular side ring 10 having a boss 11 formed on its inner surface adjacent its outer end and provided with a series of threaded sockets 12. A cooperating metallic annular ring 13 is provided having at its outer edge the boss 14 provided with a series of bores 15 formed therein, the outer surface being countersunk as at 16 to accommodate the head 17 of the screw 18 which is threaded into the socket 12.

It will be noted that the rings 10 and 13 are practically duplicates of each other, the boss in one of the members having the socket and in the other member being provided with the bore and countersink. A metallic ring 18' is provided having a series of centrally positioned circumferentially extending and circumferentially spaced bosses 19 formed on its inner surface. The edges of the ring 18' are inwardly turned to provide the flanges 20 and 21, these flanges being inclined parallel to the surface 22 of the boss 11 and the surface 23 of the boss 14.

A tread 24 formed from some yieldable material preferably rubber has its edges 25 and 26 turned inwardly to lie in engagement with the flange 20 and the surface 22 and with the flange 21 and the surface 23 respectively.

The construction is such that upon a threading of the screws 18 into the sockets 12 the rings 10 and 13 will be brought into approach relatively to each other so as to bind securely in fixed position the inturned edges 25 and 26 of the tread 24. It is evident that by this method of connection the tread 24 is securely held in position while the screws 18 are threaded into the sockets 12 sufficiently and that the tread 24 may be easily and quickly removed and replaced by loosening the screws 18.

The ring 18' is secured by screws 27 to resilient rings 28, each of these rings having a flattened portion 29 for engagement with the boss 19. Diametrically opposite the flattened portion 29 is another flattened portion 30 which engages the rim 8, the rings 28 being secured by screws 31 to the rim 8.

In operation the tire, which comprises the rings 10, 13 and 18' and the tread 24, will serve to float in response to pressure exerted upon it bodily of the wheel 7 so as to provide the cushion effect. When the pressure is exerted upon the wheel the springs 28 will, of course, be compressed slightly to provide the yielding effect.

The structure is believed to be a simple and durable one which is easily and quickly attached to a vehicle wheel and one which provides means for detachably connecting a tread member thereon so that as the tread member becomes worn it may be replaced with a new one. In this way the amount of rubber or yieldable material used on the tire is reduced to a minimum which will lend to economy in the manufacture and use of the vehicle.

While I have illustrated and described the preferred form of structure, I do not wish to limit myself to the precise form of structure shown, but desire to avail myself of such variations and modifications as come within the scope of the appended claims.

Having thus described my invention what

I claim as new and desire to secure by Letters Patent is:

1. A vehicle tire of the class described comprising an annular member; a series of circumferentially extending and circumferentially spaced bosses carried on the inner surface of said member; inwardly projecting angularly extending flanges at opposite edges of said annular member; a plurality of resilient members for connecting the bosses on said annular member to a vehicle wheel; a detachable tread; and means for clamping opposite edges of said tread against said inwardly projecting flanges.

2. A vehicle tire adapted for mounting on a vehicle wheel comprising a pair of rings, each having inclined bearing surface at its outer edge; a tread supporting annular member having bearing surfaces at its opposite edges in engagement with the aforesaid bearing surface; resilient means for connecting said annular member to said vehicle wheel; a tread positioned detachably on said annular member and having its edges turned inwardly toward each other; and means for clamping said inturned edges between said engaging surfaces.

3. A vehicle tire adapted for mounting on a vehicle wheel comprising a pair of rings; one positioned on the inner side and the other on the outer side of said wheel; an engaging surface on the outer edge of each of said rings; a tread supporting annular member having engaging surfaces at opposite edges; a series of circumferentially extending, centrally positioned and circumferentially spaced bosses on the inner surface of said annular member; resilient means for connecting the bosses on said annular member to said vehicle wheel; a detachable tread having its inner edges turned inwardly and clamped between the edges of said annular member and said engaging surfaces upon approach of said rings toward each other; and means for moving said rings into relative approach.

4. A vehicle tire adapted for mounting on a vehicle wheel comprising a pair of metallic rings positioned one at each side of said wheel, each of said rings having at its outer edge an engaging surface inclined to the axis of said wheel; a tread supporting annular member having at its opposite edges engaging surfaces parallel to said first mentioned engaging surfaces; a tread detachably mounted on said annular member having its edges folded inwardly to lie between the engaging surfaces on said rings and the engaging surfaces on said annular member; an approach of said rings toward each other effecting a clamping of said inturned edges of said tread between said engaging surfaces; means for moving said rings into relative approach; a plurality of circular springs connecting the inner surface of said annular member to said wheel.

In testimony whereof I have signed the foregoing.

FRANK E. RUSH.